(12) United States Patent
Lüchinger

(10) Patent No.: US 7,922,044 B2
(45) Date of Patent: *Apr. 12, 2011

(54) DOSAGE-DISPENSING DEVICE FOR SUBSTANCES IN POWDER OR PASTE FORM

(75) Inventor: Paul Lüchinger, Uster (CH)

(73) Assignee: Mettler-Toledo AG, Greifensee (CH)

( * ) Notice: Subject to any disclaimer, the term of this patent is extended or adjusted under 35 U.S.C. 154(b) by 776 days.

This patent is subject to a terminal disclaimer.

(21) Appl. No.: 11/884,209

(22) PCT Filed: Oct. 3, 2006

(86) PCT No.: PCT/EP2006/067008

§ 371 (c)(1),
(2), (4) Date: Aug. 13, 2007

(87) PCT Pub. No.: WO2007/039612

PCT Pub. Date: Apr. 12, 2007

(65) Prior Publication Data

US 2008/0185401 A1  Aug. 7, 2008

(30) Foreign Application Priority Data

Oct. 3, 2005  (EP) .................................... 05109150
Oct. 3, 2005  (EP) .................................... 05109151

(51) Int. Cl.
*G01F 11/10* (2006.01)
(52) U.S. Cl. ....................................... 222/344; 222/239
(58) Field of Classification Search .................. 222/344, 222/239, 345–347, 367, 408, 414, 411, 365, 222/240, 453, 457, 440, 402.25
See application file for complete search history.

(56) References Cited

U.S. PATENT DOCUMENTS

| 427,165 | A | * | 5/1890 | Fickett | 222/230 |
| 1,171,575 | A | * | 2/1916 | Zsidakovitz | 222/336 |
| 1,313,174 | A | * | 8/1919 | Eishenhardt | 222/365 |
| 1,547,953 | A | * | 7/1925 | Palmer | 222/510 |
| 1,637,189 | A | * | 7/1927 | Helberger | 222/336 |

(Continued)

FOREIGN PATENT DOCUMENTS

DE  198 41 478 A1  3/1999

(Continued)

*Primary Examiner* — Lien T Ngo
(74) *Attorney, Agent, or Firm* — Buchanan Ingersoll & Rooney PC

(57) ABSTRACT

A dosage-dispensing device for substances in powder- or paste form is equipped with a supply container and a dosage-dispensing head which is connected or connectable to the supply container and has a housing with an outlet orifice of circular cross-section. The dosage-dispensing head further has a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis relative to the outlet orifice. The delivery- and closure element in its basic configuration is of a cylindrical shape and has at least one closure portion that serves to close off the outlet orifice and further has, adjacent to the closure portion, a delivery portion that serves to deliver the substance to be dispensed, wherein the delivery portion has at least one recess that is indented from the cylinder wall.

23 Claims, 6 Drawing Sheets

U.S. PATENT DOCUMENTS

| | | | |
|---|---|---|---|
| 2,084,029 A | | 3/1935 | Hochstim |
| 2,121,878 A | * | 6/1938 | Locker ............... 222/179.5 |
| 2,311,330 A | * | 2/1943 | Dudley ............... 222/197 |
| 2,357,387 A | * | 9/1944 | Dudley ............... 222/205 |
| 2,630,246 A | * | 3/1953 | Gilmore ............... 222/142.6 |
| 2,847,147 A | * | 8/1958 | Land ............... 222/341 |
| 3,064,858 A | * | 11/1962 | Ziegler ............... 222/49 |
| 3,486,664 A | * | 12/1969 | Loomans ............... 222/413 |
| 3,790,040 A | * | 2/1974 | Bahr et al. ............... 222/413 |
| 3,823,853 A | * | 7/1974 | Alden ............... 222/365 |
| 4,895,274 A | * | 1/1990 | Morimoto et al. ............... 222/63 |
| 4,905,525 A | | 3/1990 | Kurfürst |
| 5,138,979 A | * | 8/1992 | Baird et al. ............... 119/51.04 |
| 5,145,009 A | | 9/1992 | Mheidle et al. |
| 5,259,537 A | * | 11/1993 | Beers et al. ............... 222/246 |
| 6,237,815 B1 | * | 5/2001 | Schlosser ............... 222/241 |
| 2007/0080179 A1 | * | 4/2007 | Brinz et al. ............... 222/412 |

FOREIGN PATENT DOCUMENTS

| | | |
|---|---|---|
| EP | 0 201 777 A2 | 11/1986 |
| EP | 0 654 422 A1 | 5/1995 |
| FR | 2 607 794 A1 | 6/1988 |
| FR | 2 682 083 A1 | 4/1993 |
| GB | 701572 A | 12/1953 |
| GB | 1 601 568 A | 10/1981 |
| JP | 60-52724 A | 3/1985 |

* cited by examiner

FIG. 10c FIG. 10d

DOSAGE-DISPENSING DEVICE FOR SUBSTANCES IN POWDER OR PASTE FORM

The invention relates to a dosage-dispensing device for substances in powder- or paste form which has a dosage-dispensing head that can be or is connected to a source- or supply container.

Dosage-dispensing devices of this kind find application particularly for the dispensing of small quantities of, e.g., toxic substances into small target containers with a high degree of precision. Such target containers are frequently set on a balance in order to weigh the quantity of substance delivered out of the dosage-dispensing device, so that the substance can subsequently be further processed as directed.

The substance to be dispensed in doses is held for example in a supply container which has a connection to the dosage-dispensing head. To perform the dosage-dispensing process, the supply container and the dosage-dispensing head together form a unit, the dosage dispensing-device. The opening of the dosage-dispensing device through which the substance to be dispensed is delivered should preferably be small to allow the targeted delivery of the substance into a container with a narrow opening.

Dosage-dispensing devices for dry and/or powdery pourable materials, for example color dye powders, are known from the prior art and are in operation. As an example, a dosage-dispensing device is described in U.S. Pat. No. 5,145,009 A, consisting of a delivery container with a closable outlet at its underside. As a closure device, a conical valve body is used which has a narrowing taper towards the top and is movable vertically downward to open an outlet orifice. In its open position, the valve body rotates, and is equipped with means to advance the material in the direction of the outlet orifice.

The device of the foregoing description is less suitable for the dispensing of pourable material into containers that have openings with a narrow cross-section. The structure of the valve body with the upward-narrowing taper as well as the rotation of the valve body will cause the particles of the pourable material to leave the outlet with a radial, i.e. horizontal velocity component and will therefore cause a scattering of the particles which can reach even beyond a relatively large opening cross-section of a receiving container.

A method and a device for the delivery of a very small sample quantity of a powder or paste, for example for applications in atomic absorption spectroscopy, are disclosed in U.S. Pat. No. 4,905,525 A. In a supply container with an outlet orifice at the end of a form channel, a piston reaches from above into the sample material in the container. A small sample quantity is pushed through the form channel and delivered from the outlet orifice by pressing the piston into the sample material so that the sample material is compacted above the form channel. In a special embodiment the container is configured in the shape of a funnel towards the outlet orifice and the piston is arranged in an oblique position relative to the outlet orifice.

A dosage-dispensing device for viscous, pasty, powdery or granular products is described in DE 198 41 478 A1, with a supply container of a shape which in the operating position of the dosage-dispensing device has a narrowing taper towards the bottom end where the container has an outlet orifice. Wiper tools are attached to a centrally arranged and rotatable hollow shaft. The dosage-dispensing device has a dosage valve with a valve stem that is arranged inside the hollow shaft, is capable of translatory up- and down-movement, and has at its bottom end a conical valve head with an upward-narrowing taper, so that the outgoing quantity of the dispensed material can be regulated and the outlet orifice can be closed off from above. In some of the embodiments described the dosage valve is likewise designed to be rotatable.

A dosage-dispensing device according to DE 198 41 478 A1 or according to U.S. Pat. No. 5,145,009 A is limited in how small the quantity to be delivered out of the container can be. As the outlet orifice is ring-shaped, the minimum width of the ring gap that can be used for dispensing cannot be narrower than the dimension of the smallest unit of a pourable material, for example a grain of powder, and consequently several units of the pourable material can exit simultaneously through the ring gap. There is further a risk that, depending on the consistency of the pourable material, a part of the gap can be clogged up. This can happen in particular if the delivery rate is to be slowed down towards the end of the dosage-dispensing process by reducing the width of the ring gap, because this will lead to a progressively less favorable ratio between the width and circumference length of the ring gap.

The object of the invention is to propose a dosage-dispensing device that allows the smallest substance quantities of powders or pastes to be filled in a controlled manner into a container.

This task is solved through the features of the independent claim 1.

A dosage-dispensing device for substances in powder- or paste form is equipped with a supply container and, connected or connectable to the latter, a dosage-dispensing head comprising a housing with an outlet orifice of circular cross-section. The dosage-dispensing head further comprising a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement relative to the outlet orifice along the central lengthwise axis. The delivery- and closure element in its basic configuration is of a cylindrical shape and has a closure portion that serves to close off the outlet orifice and, adjacent to the closure portion, a delivery portion with at least one recess from the cylinder wall, which serves to deliver the substance to be dispensed.

Thus, the delivery portion of the delivery- and closure element is shaped so that when the delivery portion of the delivery- and closure element is positioned in the outlet orifice, an effective outlet orifice opening, i.e., a passage opening, is left free which is arranged off-center and has a non-concentric configuration. With a translatory displacement of the delivery- and closure element along the central lengthwise axis of the dosage-dispensing device, the passage opening, i.e., the part of the outlet orifice through which the substance to be dispensed leaves the dosage-dispensing device during the dispensing operation, can be made continuously larger or smaller in a defined manner. Besides, the orientation of the passage opening relative to the central lengthwise axis is changed continually by the rotation.

This variable outlet orifice or passage opening allows the delivery of larger or smaller substance quantities depending on the requirements. It offers in particular the possibility to deliver substance quantities of the smallest order, for example powder in the microgram range. In a dosage-dispensing process, a large substance quantity can thus be delivered in a first phase with a relatively large passage opening, and as a given target quantity is being approached, the passage opening can be reduced by the translatory movement of the delivery- and closure element in such a way that only a very small flow of substance is delivered and the target quantity can therefore be met with the utmost accuracy. Thus, unless the outlet orifice is completely closed off, the passage opening always has a defined cross-section that is optimized for the substance to be dispensed.

The at least one recess in the delivery portion of the delivery- and closure element can have a continuous or discontinuous surface shape. In the latter case, the recess is formed as a groove. The surface of the recessed area thus forms a delivery surface. Under this concept, the shape of the delivery surface can be concave-curved in one direction or in two directions.

In a special embodiment, the delivery surface is configured with a spiral-shaped twist about the central lengthwise axis.

As a particular feature, the width and depth of the selected recess configuration define a variable recess profile that becomes smaller towards the closure portion.

Besides, the rotation of the delivery- and closure element also generates and maintains the flow movement of the substance to be delivered. With the different ways in which a recess can be configured, particularly with regard to the delivery surface on the delivery- and closure element, it is possible among other things to control the flow of the substance to be delivered. The passage opening, in particular the cross-sectional area of the latter, can thus be optimized for the given factors of the material to be dispensed.

In the closed position of the delivery- and closure element, the lower end (in the operating position of the apparatus) of the closure portion ends flush with the housing. In a particularly advantageous embodiment, the closure portion of a delivery- and closure element has in its end surface a recess that is enclosed by a rim which acts as a drop-releasing edge.

Thus, the delivery portion of the delivery- and closure element is shaped so that when the delivery portion of the delivery- and closure element is positioned in the outlet orifice, at least one passage opening is left free which is arranged off-center and has a non-concentric configuration.

In a particularly preferred further developed embodiment, the dosage-dispensing device includes a conveying tool which is likewise configured to be rotatable about the central lengthwise axis. By means of the conveying tool, substance that is to be dispensed is moved towards the outlet orifice and substance that clings to the edge of the housing that surrounds the outlet orifice—hereinafter referred to as the rim of the outlet orifice—is released from the latter. Thus, no substance remains in the outlet orifice. This eliminates the possibility of substance getting caught in the outlet orifice whereby a complete closure would be made impossible when the outlet orifice is to be completely closed at the end of the dispensing process. The conveying tool also makes it possible to dispense strongly coagulating powders as well as powders containing charged particles, or to dispense pastes, in that the conveying tool loosens these substances, moves them to the outlet orifice, and wipes them off the rim of the outlet orifice.

The conveying tool can be pushed against the rim of the outlet orifice by means of a spring force. In a preferred design, the conveying tool has a stirrer part and a conveying element, wherein the conveying element in an advantageous design has a portion with an extensive smooth surface and, when in operation, the conveying element is always in loose contact with the rim of the outlet orifice. In a specific configuration, the conveying element has a tip which is in contact with the rim of the outlet orifice during operation.

With preference, the conveying element is positioned at an acute angle relative to the tangential direction of the circular path traveled by the conveying element in its rotation about the central lengthwise axis, and/or the conveying element is slanted at an acute angle relative to the central lengthwise axis.

In a specific embodiment, the delivery- and closure element is connected to a rod which is arranged along the central lengthwise axis and traverses the supply container as a drive shaft, and the conveying tool is constrained in relation to the rod and the delivery- and closure element in such a way that the conveying tool is capable of translatory displacement along the central lengthwise axis.

In a particularly preferred further developed embodiment, the dosage-dispensing head and/or the dosage-dispensing device itself has a housing of a shape that is narrowed down towards the outlet orifice.

The dosage-dispensing device is hereinafter described through examples that are represented schematically in the drawings, wherein:

FIG. 10b shows the delivery- and closure element of FIG. 10a, but rotated by 90° in relation to the view of FIG. 10a;

FIG. 10c shows the delivery- and closure element of FIG. 10a in a three-dimensional view;

FIG. 10d shows the delivery- and closure element of FIG. 10a in a three-dimensional view;

FIG. 11b shows the third embodiment of the delivery- and closure element, but rotated by 90° in relation to the view of FIG. 11a;

Figure 1:
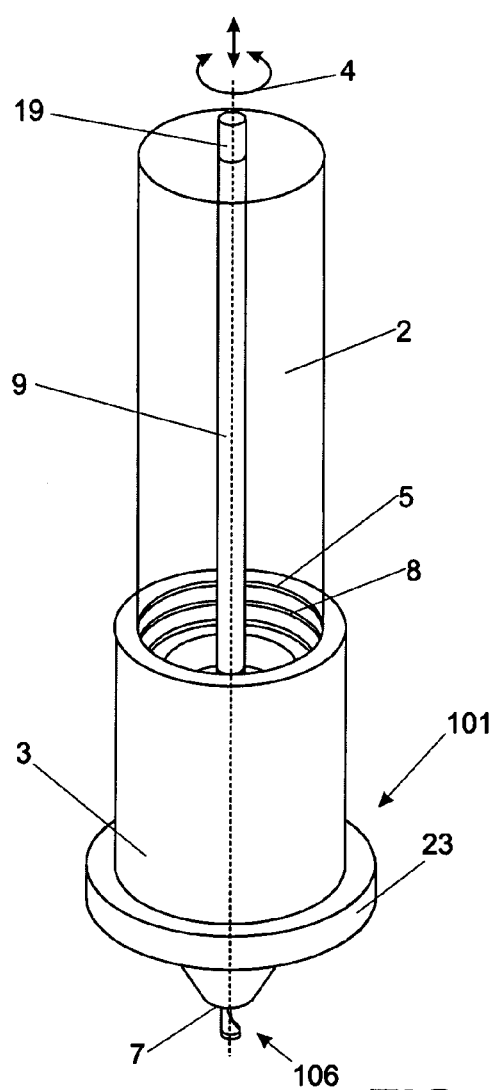
FIG. 1 illustrates in a three-dimensional drawing a dosage-dispensing device with a dosage-dispensing head screwed on to a supply container.

FIG. 1 shows a dosage-dispensing device for substances in powder- or paste form which includes a dosage-dispensing head 101 and a supply container 2. The dosage-delivery device has in essence an axially symmetric configuration. In its operating position, for example in a dosage-dispensing process, it is oriented with its central lengthwise axis 4 directed vertically. In the arrangement of FIG. 1, the dosage-dispensing head 101 which has a housing 3 is located below the supply container 2. It is joined to the supply container 2, and prior to filling the supply container, the dosage-dispensing head is screwed onto the supply container by means of an internal screw thread 5 of the dosage-dispensing head 101 and an external screw thread 8 of the supply container 2. In principle, the dosage-dispensing head can be releasably connected to the supply container through any state-of-the-art connection, or it can also have a fixed connection to the supply container. However, to facilitate cleaning, a dosage-dispensing head 101 that can be set or screwed onto the supply container 2 is preferable.

The housing 3 has a projecting ledge 23 which serves for example to fasten the dosage-dispensing device in a holder that is not shown here. The housing 3 is narrowed down towards the outlet orifice 7 in order to improve the way in which the substance to be dispensed is directed towards the outlet orifice 7. However, although this narrowed-down shape is preferred, it is not an absolute requirement.

As can be seen in FIG. 1, a delivery- and closure element 106 protrudes partially from the outlet orifice 7. This illustrates a partially open condition of the outlet orifice 7, meaning that substance to be dispensed can leave the outlet orifice 7. A rod 9 that is connected to the delivery- and closure element 106 and forms a drive shaft passes through the supply container 2 and, as shown in FIG. 1, has its upper end protruding from the supply container 2. At the protruding end, the rod 9 has a coupling area 19 for a drive source which is not shown here and which may be a manual or motorized drive mechanism.

Figure 2A:
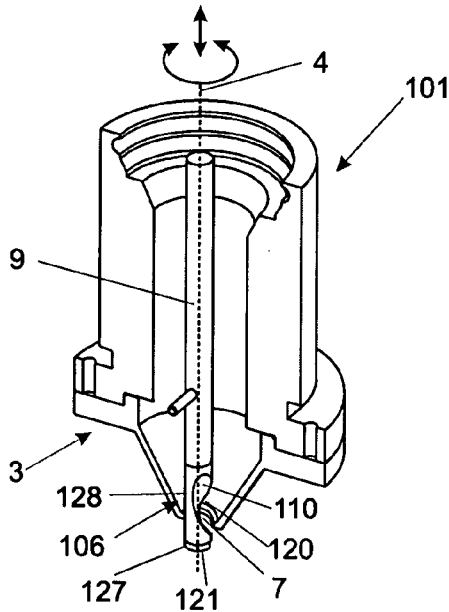
FIG. 2a illustrates in a three-dimensional drawing a dosage-dispensing head with a first embodiment of the delivery- and closure element in the open position, with the housing of the dosage-dispensing head cut open in the lengthwise direction.

FIG. 2a shows a dosage-dispensing head 101 with a first embodiment of a delivery- and closure element 106 in a three-dimensional representation wherein the housing 3 of the dosage-dispensing head 101 is cut open lengthwise. The outlet orifice 7 is partially open. The delivery- and closure element 106 is in fixed connection with the rod 9 which extends along the central lengthwise axis 4 of the dosage-dispensing head 101 or of the dosage-dispensing device. The rod 9, and thus the delivery- and closure element 106 is configured to be rotatable about the central lengthwise axis 4 as well as capable of translatory movement along the latter. The rod 9 in this arrangement is preferably driven by a motor. It is considered self-evident that the delivery- and closure element can also be of one piece together with the rod.

The delivery- and closure element 106 has a closure portion 127 which is of a cylindrical configuration and which in its closed position (see FIG. 2b) closes the outlet orifice 7 with a tight fit. When a dosage-dispensing process is taking place, the outlet orifice 7 is at least partially open and thus forms a passage opening which represents an effective outlet orifice opening. In this case, a delivery portion 128 of the delivery- and closure element 106, which is arranged adjacent to the closure portion 127, reaches partially into the outlet orifice 7.

Figure 2B:
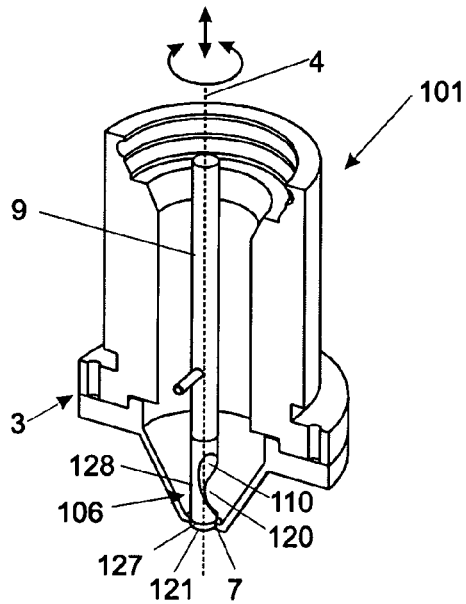
FIG. 2b illustrates in a three-dimensional drawing a dosage-dispensing head with a first embodiment of the delivery- and closure element in the closed position, with the housing of the dosage-dispensing head cut open in the lengthwise direction.

FIG. 2b shows the dosage-dispensing head in an analogous representation as FIG. 2a, with the difference that the outlet orifice in FIG. 2b is completely closed off by the delivery- and closure element 106. The opening and closing of the outlet orifice 7 takes place by moving the delivery- and closure element 106 along the central lengthwise axis 4, i.e. vertically in the arrangement of FIGS. 2a and 2b.

In the portion of the delivery- and closure element 106 which is designed to move into and out of the outlet orifice 7 with a movement along the central lengthwise axis 4, the delivery- and closure element 106 has an indentation in the form of a recess 120. The surface of the recess 120 is a smooth, continuous surface and forms a delivery surface 110. The recess 120 is located in, and constitutes, the delivery portion 128 of the delivery- and closure element 106 whose basic shape is cylindrical. In this embodiment the closure portion 127 in the operating position of the dosage-delivery device is arranged below the delivery portion 128, which means that the closure portion 127 forms the outer end of the delivery- and closure element 106. With this arrangement, the surface 121 that forms the bottom end of the delivery- and closure element 106 can close the outlet orifice 7 of the dosage-dispensing head 101 in level alignment with the rim of the opening as shown in FIG. 2b. The outlet orifice 7 has in this case a diameter which substantially matches the diameter of the delivery- and closure element 106 in the closure portion 127, so that the delivery- and closure element 106 can move into and out of the outlet orifice 7 with a precise fit whereby the outlet orifice 7 can be totally closed.

In principle, the outlet orifice 7 in the illustrated version of the delivery- and closure element 106 could also be closed by means of a portion of the delivery- and closure element 106 that is located above the recess 120. However, a closure of the outlet orifice with a flush alignment is preferred, because it reduces the risk that some of the substance remains clinging to the delivery- and closure element.

The delivery surface 110 is a surface that is curved at least in one direction and has a spiraling twist about the central lengthwise axis. However, the delivery surface could also be concave-curved in two directions in the area of the recess 120 and/or it could have a spiraling twist about the central lengthwise axis 4. The width and depth of the recess 120 in the delivery portion 128 become smaller in the direction towards the closure portion 127.

When the delivery- and closure element 106 is moved along the central lengthwise axis 4, the recess 120 gets positioned in the area of the outlet orifice 7 whereby the latter is partially opened, forming a passage opening that allows substances that are to be delivered to pass through. This allows a targeted control of the delivery of substances in powder- or paste form, as the delivery portion 128 of the delivery- and closure element 106 reaches at any moment more or less deeply into the outlet orifice 7 and thereby forms a passage opening of variable size. For powder of a fine grain size and a loose-flowing consistency, the dosage-dispensing head 101 of the foregoing description can achieve a volume flow that allows doses in the microgram range to be dispensed. The preferred means for measuring the delivered substance quantity is a balance, which is not shown in the drawing as it is not a subject of the invention.

A concave curvature of the surface 110 and in particular a slightly spiraling shape of the recess 120 about the central lengthwise axis has the effect that with the rotation of the delivery- and closure element 106 the substance to be delivered is taken along and delivered in a controlled manner by the delivery surface 110. This is of particular advantage in the case of coagulating substances which with a delivery surface 110 without curvature could possibly get stuck between the rim of the outlet orifice 7 and the delivery surface 110, whereby the outlet orifice 7 could become clogged up. The direction in which the delivery- and closure element 106 rotates for the dispensing of substance is adapted to the configuration of the delivery portion 128 among other factors.

For the dispensing of pulverous substances with poor pouring properties, i.e. for example cloggy powders, or for the dispensing of pasty substances, it is of considerable advantage to use a conveying tool 12. In the embodiment shown in FIG. 3, a conveying tool 12 is arranged inside the dosage-dispensing head 101. The conveying tool 12 has a supporting and guiding device with ring-shaped holders embracing the rod 9 in two positions above each other, whereby the conveying tool 12 is loosely connected to the rod 9. The conveying tool 12 further has a stirrer part 14 and a conveying element 15 configured in the shape of a shovel or a scraper. An upper ring-shaped holder 29 of the conveying tool 12 is arranged above a transverse bolt 16 that is solidly connected to the rod 9, while a lower ring-shaped holder 30 is arranged below the transverse bolt 16. With this arrangement, the conveying tool 12 is guided and constrained in the dosage-dispensing device. With a translatory movement of the rod 9 along the central lengthwise axis 4, i.e., when the outlet orifice 7 is opened or closed, the loose attachment of the conveying tool 12 to the rod 9 ensures that, due to the force of gravity, the conveying tool 12 always remains in loose contact with the rim of the outlet orifice 7. Furthermore, as the rod 9 rotates, the transverse bolt 16 is brought into contact with the stirrer part 14 and pushes the conveying tool 12 to participate in the rotation.

The stirrer part 14 serves to loosen the substance to be dispensed during the time while the substance is in the area of the dosage-dispensing head 101.

As already mentioned, the conveying element 15 remains in contact with the rim of the outlet orifice 7 also when the delivery- and closure element 106 is in the open position, so that with the rotation of the delivery- and closure element 106, the substance to be dispensed is conveyed to the outlet orifice 7 and if particles remain clinging to the outlet orifice 7, they are released and the dosage material is delivered. The conveying element 15 preferably includes a portion with an extensive smooth surface with a tip 17 facing towards the rim of the outlet orifice 7, wherein the tip 17 is in loose contact with the rim of the outlet orifice 7. The conveying element 15, more specifically its extensive smooth surface portion, preferably has a rounded or curved shape, so that it can act like a shovel to take along strongly coagulated powder and direct it to the outlet orifice 7.

Since the conveying tool 12 rotates about the central lengthwise axis 4, the conveying element 15 moves on a circular path. It has proven to be advantageous if the conveying element 15 is positioned at an acute angle relative to the tangential direction of the circular path traveled by the conveying element 15 in its rotation about the central lengthwise axis 4, and/or the conveying element 15 is slanted at an acute angle relative to the central lengthwise axis 4. The angular position of the conveying element is adapted in particular to the consistency of the substance to be dispensed. The shape and orientation of the conveying tool 12 determines the sense of rotation of the delivery- and closure element 6 and thus of the conveying tool 12 for the embodiment of the dosage-dispensing device shown in FIGS. 2*a* and 2*b*. The rotation in the illustrated case is clockwise.

As already mentioned above, the conveying tool 12 is held or guided on the rod 9 in such a way that on the one hand the conveying tool 12 participates in the rotation of the rod 9 but on the other hand when the rod 9 is displaced along the central lengthwise axis, the conveying tool 12 keeps its position and does not move with the rod 9 and the delivery- and closure element, which means that the conveying element 15, particularly the tip 17 of the conveying element, always remains in loose contact with the rim of the outlet orifice 7, and that in the dispensing process the conveying tool 12 directs the powder towards the rim and wipes it off the rim. This is illustrated in FIGS. 4*a* and 4*b* which show a sectional drawing of the dosage-dispensing head 101.

Figure 4A:
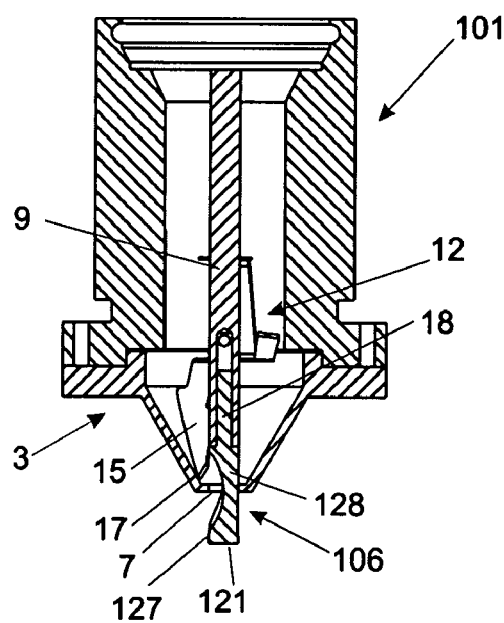
FIG. 4a shows a sectional view of the dosage-dispensing head of FIG. 3 with the delivery- and closure element in the open position.
Figure 4B:
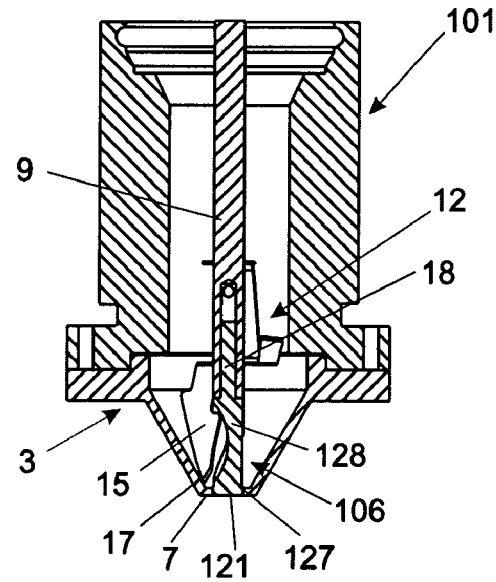
FIG. 4b shows a sectional view of the dosage-dispensing head of FIG. 3 with the delivery- and closure element shown in the closed position.

With the form of representation that was chosen for FIGS. 4*a* and 4*b* it is also possible to see how the delivery- and closure element 106 is connected to the rod 9. A bolt 18 of a smaller diameter than the diameter of the delivery- and closure element 106 is inserted in the rod 9 and is for example screwed, glued, soldered or otherwise fixedly connected to the latter.

Figure 5:
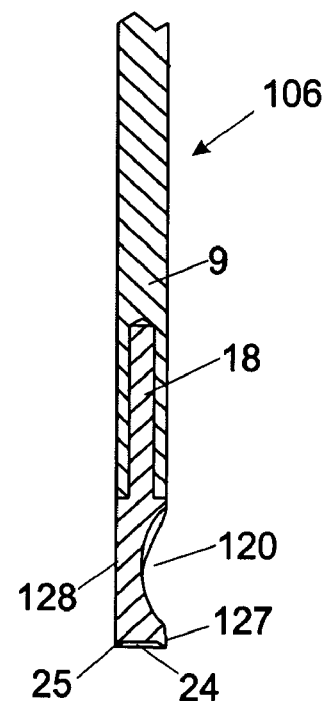
FIG. 5 shows the delivery- and closure element of the preceding figures in a sectional view.

The delivery- and closure element 106 of the preceding drawing figures can be seen in FIG. 5 in a sectional view. The delivery- and closure element 106 is connected to the rod 9 by means of a bolt 18, in particular a screw bolt. As shown here to give an example, a delivery- and closure element 106 whose closure portion 127 is in flush alignment with the housing 3 when the outlet orifice 7 is closed (as shown for example in FIG. 4*b*) can have a recess 24 at its end face. This recess 24 is surrounded by a rim 25 which acts as a drop-releasing edge, so that when strongly coagulating substances are being dispensed, it is made impossible for material to accumulate at the end surface.

Figure 6A:
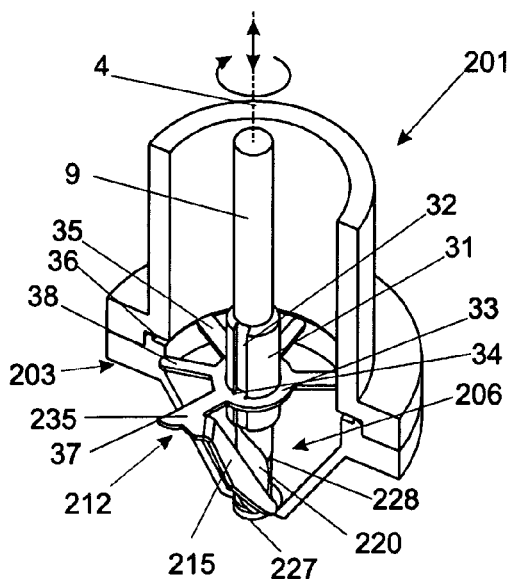
FIG. 6a shows a three-dimensional view of a dosage-dispensing head with a second embodiment of the delivery- and closure element in the closed position, and with a second embodiment of the conveying tool, with the housing cut open in the lengthwise direction.
Figure 6B:
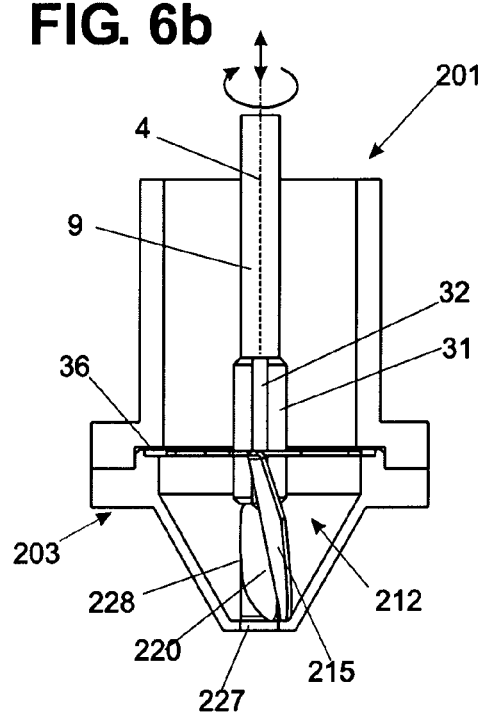
FIG. 6b shows a side view of the dosage-dispensing head of FIG. 6a, with its housing cut open in the lengthwise direction.
Figure 6C:
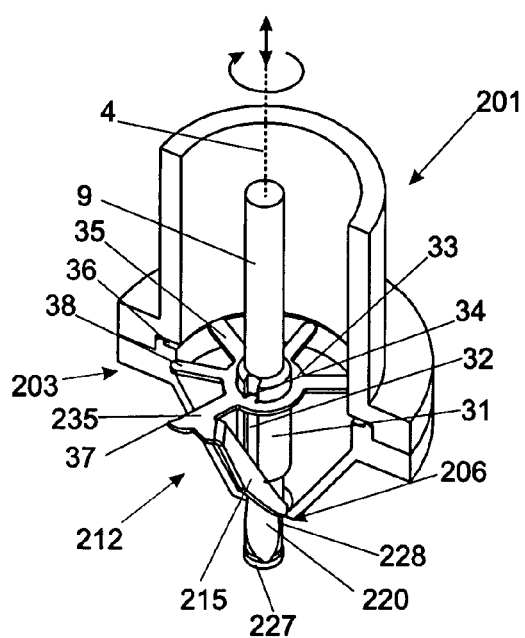
FIG. 6c shows the dosage-dispensing head of FIG. 6a with the delivery- and closure element in the open position.
Figure 6D:
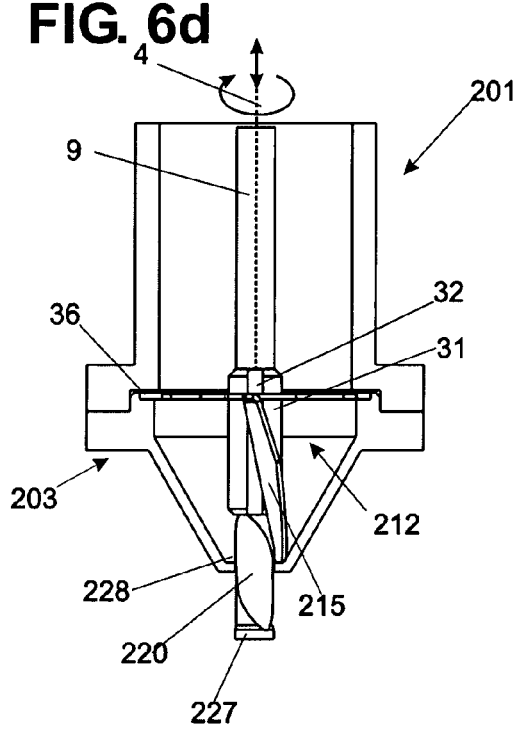
FIG. 6d shows the dosage-dispensing head of FIG. 6b with the delivery- and closure element in the open position.

FIGS. 6a to 6d illustrate a second embodiment of the delivery- and closure element 206 and its arrangement in the dosage-dispensing head 201 in the closed position as well as in the open position. FIGS. 6a and 6c show the dosage-dispensing head 201 in a perspective view, and FIGS. 6b and 6d in a side view, where in each case the housing 203 is cut open lengthwise. The delivery portion 228 has a recess 220 delimited by a concave delivery surface 210. The borders of the recess 220 are not in parallel alignment with the plane that extends orthogonal to the central lengthwise axis 4, but enclose an arbitrary angle with the latter. A recess 220 of this kind can be produced by cutting a cylindrical groove at an angle different from 90° relative to the central lengthwise axis 4. The delivery portion 228 and the closure portion 227 have slightly different diameters, allowing the outlet orifice 7 to be hermetically closed off but leaving enough clearance in the open condition to allow the free movement of the delivery- and closure element 206.

Figure 3:
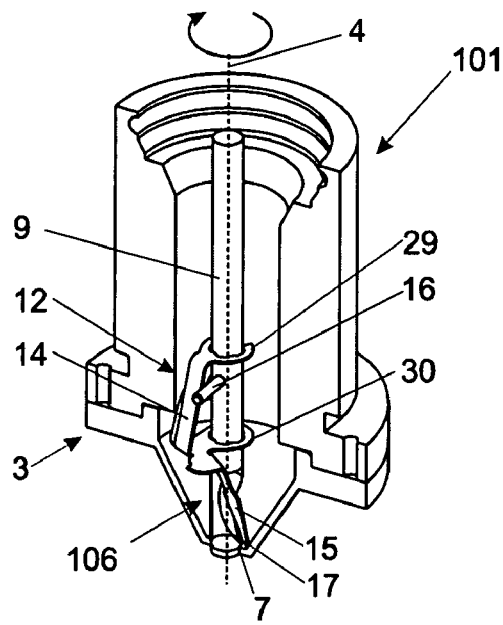
FIG. 3 illustrates the dosage-dispensing head of FIG. 2b with the addition of a conveying tool.

The second conveying tool 212 which is illustrated in FIGS. 6a to 6d has a conveying element 215 which is of a similar configuration as the conveying tool shown in FIGS. 3, 4a and 4b. In particular, the position of the conveying element 215 relative to the central lengthwise axis 4 is aligned at an acute angle relative to the tangential direction of its circular path in the rotation about the central lengthwise axis 4, as well as slanted at an acute angle relative to the central lengthwise axis 4. Furthermore, the conveying element 215 is arranged at an angle relative to the radius of its circular path and tangentially touches the rim of the outlet orifice 7. To hold and guide the conveying tool 212, the rod 9 has a take-along portion 31 with at least one groove 32 extending over the entire length of the rod 9. A holder ring 33 of the conveying tool 212 is arranged to loosely surround the take-along potion 31, engaging the groove 32 with a projection 34. Preferably, there are two grooves 32 and projections 34 arranged at diametrically opposite locations, where the second groove and projection could not be seen in the drawing, because they would be hidden by the rod 9. With this arrangement, the conveying tool 212 is constrained to share the rotation of the rod 9 but has free translatory mobility along the central lengthwise axis 4. The holder ring 33 has several spokes 35 projecting radially outwards from the central lengthwise axis 4 and engaging with their tips 37 a circular groove 36 in the housing 203 where they are movably guided. Further spokes without tips 37 serve as stirrer elements 38. The holder ring 33, the projections 34, the spokes 35, and the stirrer elements 38 lie in a plane that extends orthogonal to the central lengthwise axis 4. However, the stirrer elements 38 can also be bent upwards or downwards, which makes them more effective in loosening the substance to be dispensed. The conveying element is connected to, but preferably of one piece with, one of the spokes 235. The conveying tool 212 is made preferably made of one piece of a sheet metal or plastic material.

Figure 7A:
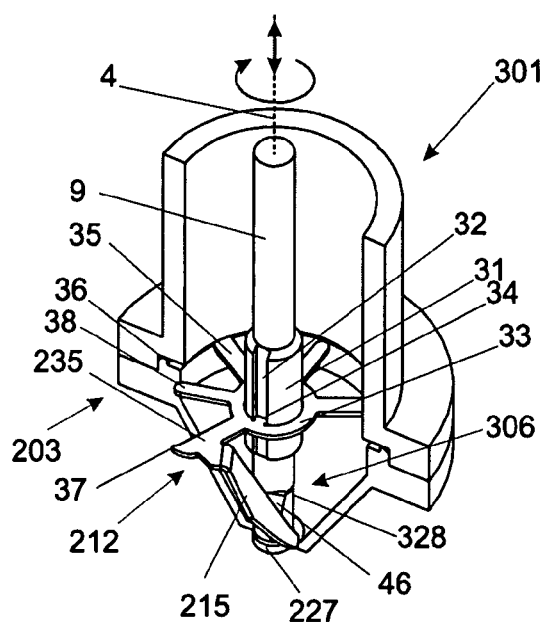
FIG. 7a shows a three-dimensional view of a dosage-dispensing head with a third embodiment of the delivery- and closure element in the closed position, and with the embodiment of the conveying tool of FIG. 6a, with the housing cut open in the lengthwise direction.
Figure 7B:
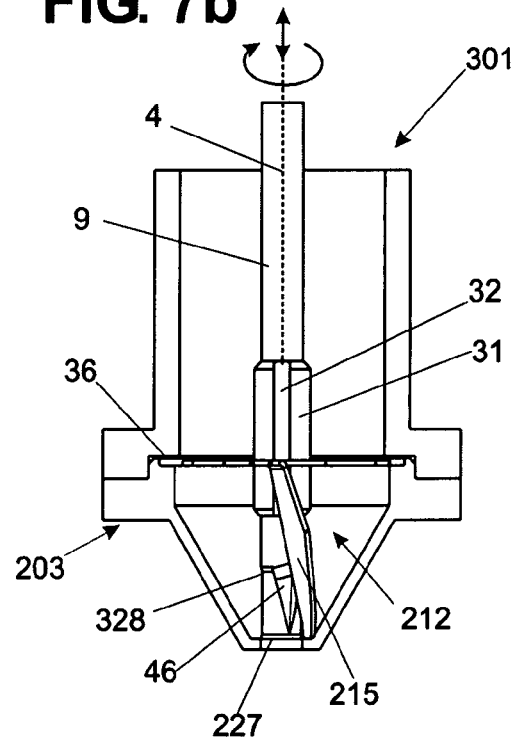
FIG. 7b shows a side view of the dosage-dispensing head of FIG. 7a, with its housing cut open in the lengthwise direction.

A third embodiment of the delivery- and closure element 306 which closes off the outlet orifice 7 can be seen in FIG. 7a in a three-dimensional view of the dosage-dispensing head 301 and in FIG. 7b in a side view, wherein the housing 303 is cut open lengthwise. In this embodiment, the delivery portion 328 of the delivery- and closure element 306 is configured as a triangular groove 46 which is arranged laterally, i.e. at an off-center location, and which narrows into a point at its lower end, meaning that its width and depth are variable, i.e. decreasing towards the closure portion 227. The delivery surface in this case is a discontinuous surface. In the dispensing process, the delivery surface picks up the substance to be dispensed and moves it out by means of its rotation. At the same time, the shape of the triangular groove 46 whose profile diminishes towards the downward end provides a passage opening that is continuously variable depending on the position of the delivery- and closure element 306 in the outlet orifice 7. It is also possible to have a plurality of grooves arranged on the delivery portion, with preference evenly distributed around the circumference of the latter. The grooves can be formed in the delivery portion with their tips directed vertically downward or slanted, as shown in FIGS. 7a and 7b.

Figure 8A:
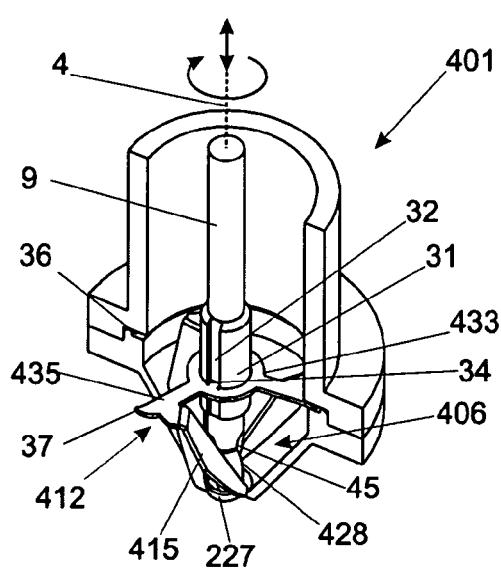
FIG. 8a shows a three-dimensional view of a dosage-dispensing head with a fourth embodiment of the delivery- and closure element in the closed position, and with a third embodiment of the conveying tool, with the housing cut open in the lengthwise direction.
Figure 8B:
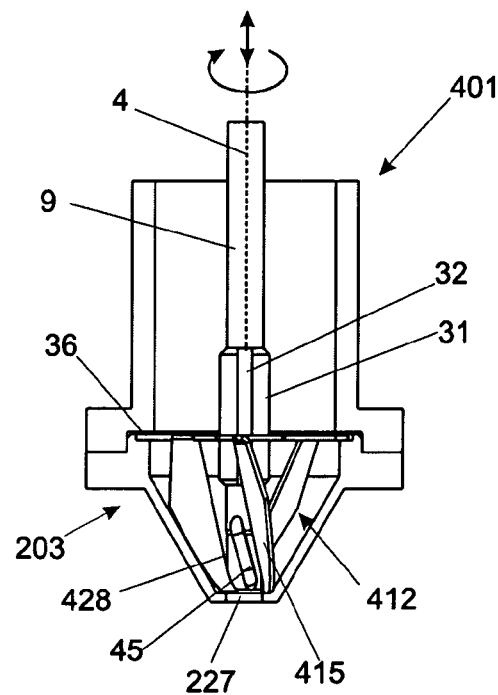
FIG. 8b shows a side view of the dosage-dispensing head of FIG. 8a, with its housing cut open in the lengthwise direction.

FIGS. 8a and 8b show a dosage-dispensing head 401 in a form of representation analogous to FIG. 7. This dosage dispensing head 401 includes a fourth embodiment of the delivery- and closure element 406 and a third embodiment of the conveying tool 412. The closure portion 227 of the delivery- and closure element 406 is configured like in the third and fourth embodiment of the delivery- and closure element, but its delivery portion 428 has several elongated grooves 54 of variable depth and width in the circumference of the substantially cylinder-shaped delivery- and closure element 406. These grooves 54 are aligned with their longest dimension slanted at an acute angle relative to the central longitudinal axis 4 and thus provide several passage openings for the substance to be dispensed when the delivery- and closure element 406 is in the open condition.

The conveying tool 412 has three conveying elements 415 which are monolithically connected to a holder ring 433. The holder ring 433 is constrained to the rod 9 by way of projections 34 engaging grooves 32 of a take-along portion 31, in the same way as has already been described above in the context of FIGS. 6a to 6d. In contrast to the embodiment represented in FIGS. 6a to 6d, the conveying tool 412 shown here has no stirrer elements 38, although they could be added. However, the functions of stirring and loosening of the substance to be dispensed can also be performed by the three spokes 435 as well as the three conveying elements 415. The latter are configured and oriented in the dosage-dispensing head 401 substantially like the conveying element 215 described above in the context of FIGS. 6 and 7. The three spokes 435, each of which is connected to a conveying element 415, have tips 37 which are movably guided in the circular groove 36 of the housing 3.

Figure 9A:
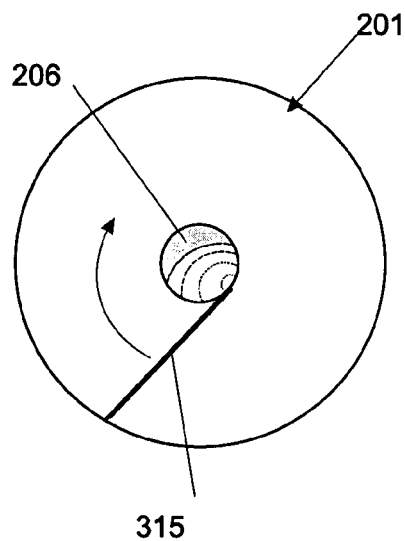
FIG. 9a shows a view from above into a dosage-dispensing head in a strongly simplified schematic view, wherein the second delivery- and closure element is shown in sectional view in the area of the outlet orifice.
Figure 9B:
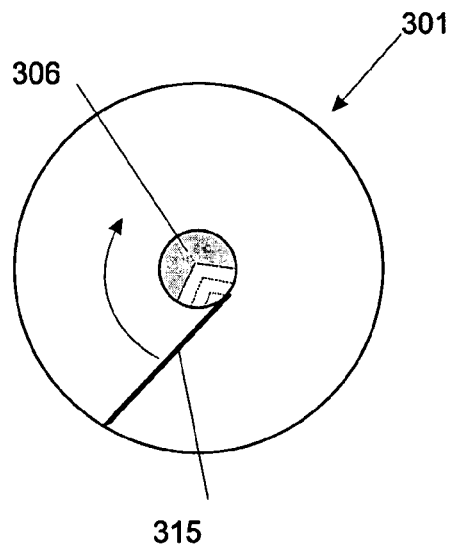
FIG. 9b shows a view from above into a dosage-dispensing head in a strongly simplified schematic view, wherein the third delivery- and closure element is shown in sectional view in the area of the outlet orifice.

FIGS. 9a and 9b give a strongly simplified schematic view into a dosage-dispensing head 201 and 301 as seen from above, wherein the respective delivery- and closure element 206, 306 is shown in sectional view in the area of the outlet orifice 7. This serves to visualize the shape that the passage opening takes at different points in time. Of the conveying tool, FIGS. 9a and 9b show a conveying element 315 which for simplicity's sake is drawn as a sheet metal part delimited by planar surfaces, as seen from the topside, wherein the conveying element 315 is positioned at an acute angle relative to the radius of its circular path and tangentially touches the rim of the outlet orifice 7, whereby with a rotation (see arrow) of the delivery- and closure element 206, 306 and of the conveying tool the substance to be delivered is directed to the passage opening.

As already mentioned above, a conveying element can also be positioned at an acute angle relative to the tangential direction of the circular path traveled by the conveying element in its rotation about the central lengthwise axis 4, and/or the conveying element can be slanted at an acute angle relative to the central lengthwise axis 4. These angles can be varied depending on the substance to be dispensed, for example by exchanging the conveying tool in the dosage-dispensing head.

Further positions of the delivery- and closure element 206, 306 by which a passage opening is delimited are indicated by a series of broken lines progressing from the upper left to the lower right of the passage opening shown in FIGS. 9a and 9b.

It is considered self-evident that the broken lines are only representative examples for a continuous variation of the passage opening.

FIG. 10 shows different views of the embodiment of the delivery- and closure element 206 which has already been presented in FIGS. 6a to 6d. FIG. 10a shows the delivery- and closure element 206 from the side with a view at the delivery surface 210, FIG. 10b shows the same in a position that is rotated by 90° relative to the representation of FIG. 10a, and FIGS. 10c and 10d show the delivery- and closure element 206 in three-dimensional views. The recess 220 in the delivery portion 228 is delimited by a concave delivery surface 210 which has borders that are not aligned parallel to the plane that runs orthogonal to the central lengthwise axis 4, but enclose an arbitrary angle with that plane. A recess of this shape can be produced by means of a cylindrical cut directed at an angle other than 90° to the central lengthwise axis 4.

Figure 10A:
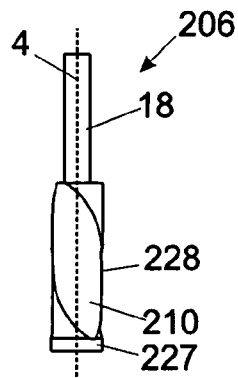
FIG. 10a shows the delivery- and closure element of FIGS. 6a to 6d seen from the side with the view directed at the delivery surface.
Figure 10B:
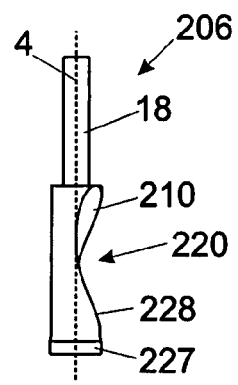
Figure 10B:
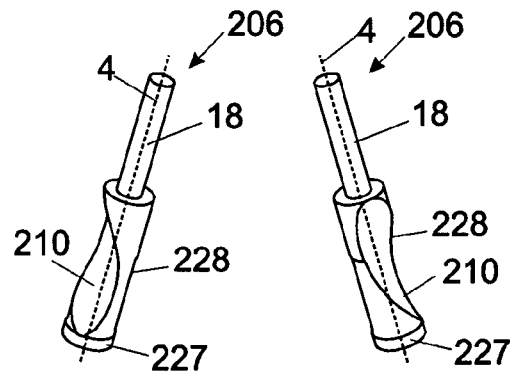

As can further be seen in FIGS. 10a and 10d, the delivery portion 228 has a slightly smaller diameter than the closure portion 227. It is considered self-evident that the outlet orifice 7 of the dosage-delivery head has a diameter that is matched to the closure portion 227, allowing the outlet orifice 7 to be hermetically closed off but leaving enough clearance in the open condition to allow the rotation of the delivery- and closure element 206. This design of a closure portion with a diameter that is different from the delivery portion is also conceivable and can be realized in the delivery- and closure elements that were presented in the preceding drawing figures.

Figure 10E:
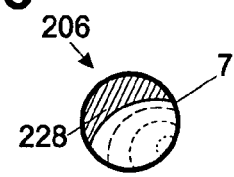
FIG. 10e shows a strongly magnified cross-sectional view of a delivery- and closure element according to FIGS. 10a to 10d in the area of the outlet orifice.

FIG. 10e shows a cross-sectional view of a delivery- and closure element 206 according to FIGS. 10a to 10d in the area of the partially closed outlet orifice 7. Further positions of the delivery- and closure element 206 by which a passage opening is delimited and which, again, stand only as representative examples for a continuous variation of the effective outlet orifice are indicated by broken lines. Depending on how far the delivery- and closure element 206 is slid into the outlet orifice 7, a passage opening of variable size is created as a result of the variable width and depth of the recess whose profile gets smaller in the direction towards the closure portion 227.

Figure 11A:
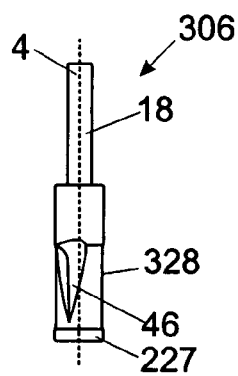
FIG. 11a shows the third embodiment of the delivery- and closure element as shown in FIGS. 7a and 7b, seen from the side with the view directed at the delivery surface.
Figure 11B:
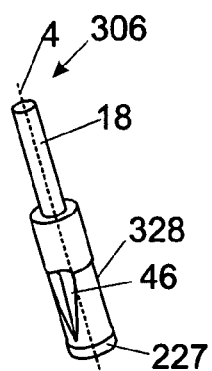
Figure 11C:
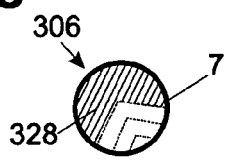
FIG. 11c shows a strongly magnified cross-sectional view of a delivery- and closure element according to FIGS. 11a and 11b in the area of the outlet orifice.

FIG. 11 shows different views of the third embodiment of the delivery- and closure element 306 which has been presented in FIGS. 7a and 7b, with FIG. 11a showing a side view and FIG. 11b showing a perspective view. The triangular groove 46, which could also be aligned at an oblique angle relative to the direction of the central lengthwise axis 4, collects the substance to be delivered in the dosage-filling process and, by rotating, directs the substance to the outlet orifice 7. Furthermore, this embodiment of the delivery- and closure element 306 likewise ensures a continuous opening and closing of the outlet orifice 7. As illustrated in FIG. 11c, showing the delivery- and closure element 306 of FIGS. 11a and 11b in a cross-sectional view in the area of the partially closed outlet orifice 7, the passage opening has a triangular cross-section wherein one side, specifically the side delimited by the rim of the outlet orifice 7, forms a circular arc. Of course, here too, the passage opening can be made continuously larger and smaller. FIGS. 11a to 11c show only one triangular groove 46 in the delivery portion 328. However, there could also be two such grooves 46 arranged on the delivery- and closure element, for example diametrically opposite each other. Here too, the diameter of the delivery portion 328 is slightly smaller than the diameter of the closure portion 327.

Figure 12A:
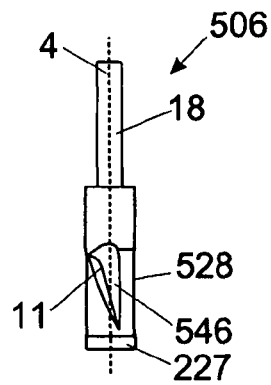
FIG. 12a shows a fifth embodiment of the delivery- and closure element seen from the side.
Figure 12B:
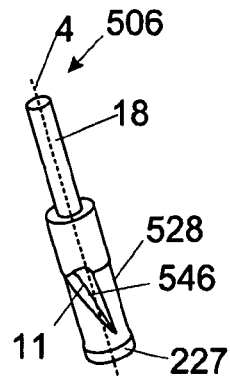
FIG. 12b shows a fifth embodiment of the delivery- and closure element in three-dimensional view.
Figure 12C:
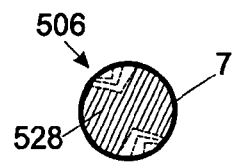
FIG. 12c shows a strongly magnified cross-sectional view of a delivery- and closure element according to FIGS. 12a and 12b in the area of the outlet orifice.

FIGS. 12a to 12c illustrate a fifth embodiment of the delivery- and closure element 506 in an analogous form of representation as used in FIGS. 11a to 11c. The recesses in the delivery portion 528 are formed as two triangular grooves 546 (only one of which can be seen in FIGS. 12a and 12b) in the overall cylindrical form of the delivery- and closure element 506. Unlike the version of the delivery- and closure element 306 shown in FIGS. 11a to 11c, the bottom lines 11 of the grooves 546 are not parallel to the central lengthwise axis, but are oriented at an oblique angle to the central lengthwise axis.

Figure 13A:
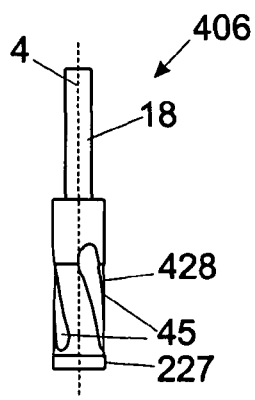
FIG. 13a shows the fourth embodiment of the delivery- and closure element as shown in FIGS. 8a and 8b, seen from the side with the view directed at the delivery surface.
Figure 13B:
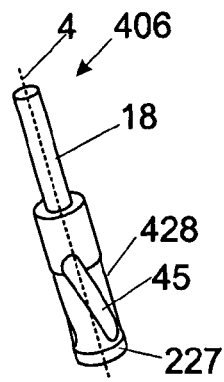
FIG. 13b shows the fourth embodiment of the delivery- and closure element in a three-dimensional view.
Figure 13C:
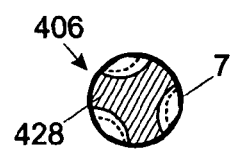
FIG. 13c shows the fourth embodiment of the delivery- and closure element in a sectional view of the area of the outlet orifice in a plane that is orthogonal to the central lengthwise axis.

FIG. 13 illustrates the fourth embodiment of the delivery- and closure element 406 as shown in FIGS. 8a and 8b, with FIG. 13a showing a side view directed at the delivery surface and FIG. 13b showing a three-dimensional view. In this embodiment, several elongated grooves 45 of variable depth and width are arranged in the circumference of the substantially cylindrical delivery- and closure element 406, which are milled for example by means of ball cutters. As FIG. 13c shows which represents a cross-section of a delivery- and closure element 406 according to FIGS. 13a and 13b in the area of the partially closed outlet orifice 7, the profile areas of the passage openings are continuously variable.

Figure 14A:
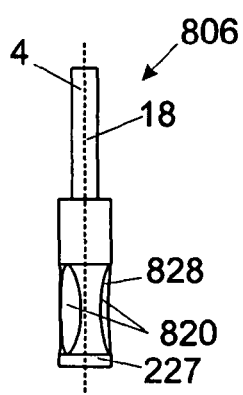
FIG. 14a shows a sixth embodiment of the delivery- and closure element seen from the side with the view directed at the delivery surface.
Figure 14B:
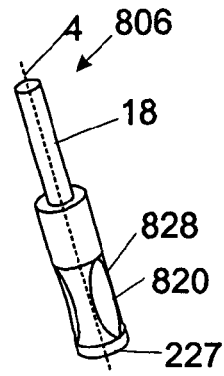
FIG. 14b shows the sixth embodiment of the delivery- and closure element in a three-dimensional view.
Figure 14C:
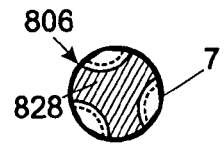
FIG. 14c shows the sixth embodiment of the delivery- and closure element in a sectional view of the area of the outlet orifice in a plane that is orthogonal to the central lengthwise axis.

FIG. 14 shows different views of a sixth embodiment of a delivery- and closure element, with FIG. 14a showing a side view directed at the delivery surface, FIG. 14b showing a three-dimensional view, and FIG. 14c showing a cross-sectional view in a plane that is orthogonal to the central lengthwise axis and intersects the outlet orifice 7. Three elongated recesses 45 with mirror-symmetric edges shaped like segments of a circle are arranged around the delivery portion 828 with their symmetry axes aligned parallel to the central lengthwise axis 4. As can be seen with particular clarity in FIG. 14c, this design concept makes three areas of the outlet orifice 7 available for the delivery of the substance where passage openings are formed whose size is continuously variable by a translatory displacement of the delivery- and closure element 806.

Depending on how far a delivery- and closure element is moved into the outlet orifice, one obtains one or more passage openings whose size is variable due to the variable width and depth of the recesses that get smaller in the direction towards the closure portion.

Variant configurations of the housing of the dosage-delivery head as well as different embodiments of the drive mechanism are conceivable. In principle it is also possible for the conveying tool to have its own drive source and to be moved in the rotatory as well as translatory sense independently of the delivery- and closure element, where the conveying tool remains in loose contact with the rim of the outlet orifice at least when a delivery of substance to be dispensed is in progress.

The rod with the delivery- and closure element in a further embodiment can be tension-biased in the direction of the central lengthwise axis, so that the outlet orifice is automatically closed when the drive source is uncoupled.

LIST OF REFERENCE SYMBOLS 101, 201, 302, 401 dosage-dispensing head
2 supply container
3, 203, 303 housing
4 central lengthwise axis 5 internal screw thread
106, 206, 306, 406, 506, 806 delivery- and closure element
7 outlet orifice
8 external screw thread
9 rod
110, 210 delivery surface
11 bottom line of the groove
12, 212, 412 conveying tool
14 stirrer part
15, 215, 315, 415 conveying element
16 transverse bolt
17 tip of the conveying element
18 bolt
19 coupling area
120, 220, 820 recess
121 end surface
23 projecting ledge
24 recess
25 rim of the recess
127, 227 closure portion
128, 228, 328, 428, 528, 828 delivery portion
29 upper ring-shaped holder
30 lower ring-shaped holder
31 take-along portion
32 groove
33, 433 holder ring
34 projection
35, 235, 435 spoke
36 circular groove
37 tip
38 stirrer element
45 elongated groove
46, 546 triangular groove

The invention claimed is:

1. Dosage-dispensing device for substances in powder- or paste form with a supply container and with a dosage-dispensing head that is connected or connectable to the supply container, said dosage-dispensing head comprising a housing with an outlet orifice of circular cross-section and a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis relative to the outlet orifice, wherein the delivery- and closure element in its basic configuration is of a cylindrical shape and has at least one closure portion that serves to close off the outlet orifice and further has, adjacent to the closure portion, a delivery portion that serves to deliver the substance to be dispensed, wherein said delivery portion comprises at least one recess that is indented from the cylinder wall, and further comprising a conveying tool which serves to convey substance to be dispensed and which is configured to be rotatable about the central lengthwise axis and supported in a way that allows translatory movement relative to the delivery- and closure element along the central lengthwise axis.

2. Dosage-dispensing device according to claim 1, wherein the recess has a continuous surface that forms a delivery surface.

3. Dosage-dispensing device according to claim 1, wherein the recess is configured in the shape of a triangular groove and has a discontinuous surface that forms a delivery surface.

4. Dosage-dispensing device according to claim 2, wherein the delivery surface has a shape that is concave-curved in one or two directions.

5. Dosage-dispensing device according to claim 3 wherein the delivery surface is shaped with a spiraling twist about the central lengthwise axis.

6. Dosage-dispensing device according to claim 1, wherein in the closed position of the delivery- and closure element the closure portion at its bottom end relative to the operating position of the dosage-dispensing device is in flush alignment with the housing.

7. Dosage-dispensing device according to claim 6, wherein the closure portion at its end surface has a recess that is surrounded by a rim which works as a drop-releasing edge.

8. Dosage-dispensing device according to claim 1, wherein the width and/or the depth of the at least one recess of the delivery portion varies so that its profile area gets smaller in the direction towards the closure portion.

9. Dosage-dispensing device for substances in powder- or paste form with a supply container and with a dosage-dispensing head that is connected or connectable to the supply container, said dosage-dispensing head comprising a housing with an outlet orifice of circular cross-section and a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis relative to the outlet orifice, wherein the delivery- and closure element in its basic configuration is of a cylindrical shape and has at least one closure portion that serves to close off the outlet orifice and further has, adjacent to the closure portion, a delivery portion that serves to deliver the substance to be dispensed, wherein said delivery portion comprises at least one recess that is indented from the cylinder wall, and the delivery portion is shaped so that when the delivery portion of the delivery- and closure element is positioned in the outlet orifice, at least one passage opening is left free which is arranged off-center and has a non-concentric configuration, and further comprising a conveying tool which serves to convey substance to be dispensed and which is configured to be rotatable about the central lengthwise axis and supported in a way that allows translatory movement relative to the delivery- and closure element along the central lengthwise axis.

10. Dosage-dispensing device according to claim 1, wherein the delivery- and closure element is connected to a rod which is arranged along the central lengthwise axis and traverses the supply container as a drive shaft.

11. Dosage-dispensing device according to claim 1, wherein the conveying tool is supported and/or guided on the rod in a way that allows translatory movement along the rod and relative to said rod.

12. Dosage-dispensing device for substances in powder- or paste form with a supply container and with a dosage-dispensing head that is connected or connectable to the supply container, said dosage-dispensing head comprising a housing with an outlet orifice of circular cross-section and a delivery- and closure element, wherein the outlet orifice and the delivery- and closure element are arranged on the central lengthwise axis of the dosage-dispensing head, and the delivery- and closure element is designed to be rotatable about the central lengthwise axis in relation to the housing and to be capable of translatory displacement along the central lengthwise axis relative to the outlet orifice, wherein the delivery- and closure element in its basic configuration is of a cylindrical shape and has at least one closure portion that serves to close off the outlet orifice and further has, adjacent to the closure portion, a delivery portion that serves to deliver the substance to be dispensed, wherein said delivery portion comprises at least one recess that is indented from the cylinder wall, and further comprising a conveying tool which serves to convey substance to be dispensed and which is configured to be rotatable about the central lengthwise axis and supported in a way that allows translatory movement relative to the delivery- and closure element along the central lengthwise axis, and wherein the conveying tool comprises a stirrer part and a conveying element, wherein the conveying element is always in loose contact with the rim of the outlet orifice when the dosage-dispensing device is in operation.

13. Dosage-dispensing device according to claim 1, wherein the housing has a narrowing taper in the direction towards the outlet orifice.

14. Dosage-dispensing device according to claim 4, wherein the delivery surface is shaped with a spiraling twist about the central lengthwise axis.

15. Dosage-dispensing device according to claim 5, wherein in the closed position of the delivery- and closure element the closure portion at its bottom end relative to the operating position of the dosage-dispensing device is in flush alignment with the housing.

16. Dosage-dispensing device according to claim 7, wherein the width and/or the depth of the at least one recess of the delivery portion varies so that its profile area gets smaller in the direction towards the closure portion.

17. Dosage-dispensing device according to claim 8, wherein the delivery portion of the delivery- and closure element is shaped so that when the delivery portion of the delivery- and closure element is positioned in the outlet orifice, at least one passage opening, is left free which is arranged off-center and has a non-concentric configuration.

18. Dosage-dispensing device according to claim 9, wherein the delivery- and closure element is connected to a rod which is arranged along the central lengthwise axis and traverses the supply container as a drive shaft.

19. Dosage-dispensing device according to claim 10, wherein the dosage-dispensing device comprises a conveying tool which serves to convey substance to be dispensed and which is configured to be rotatable about the central lengthwise axis and supported in a way that allows translatory movement relative to the delivery- and closure element along the central lengthwise axis.

20. Dosage-dispensing device according to claim 11, wherein the conveying tool comprises a stirrer part and a conveying element, wherein the conveying element is always in loose contact with the rim of the outlet orifice when the dosage-dispensing device is in operation.

21. Dosage-dispensing device according to claim 12, wherein the housing has a narrowing taper in the direction towards the outlet orifice.

22. A dosage-dispensing head to comprising:
   a housing with an outlet orifice of circular cross-section;
   a delivery- and closure element, wherein the outlet orifice and the delivery- and closure element are arranged on a central lengthwise axis of the dosage-dispensing head, and the delivery- and closure element is rotatable about the central lengthwise axis in relation to the housing and is capable of translatory displacement along the central lengthwise axis relative to the outlet orifice;
   a conveying tool which serves to convey substance to be dispensed and which is rotatable about the central lengthwise axis;
   wherein the delivery- and closure element is of a generally cylindrical shape and has at least one closure portion that serves to close off the outlet orifice and further has, adjacent to the closure portion, a delivery portion that serves to deliver a substance to be dispensed, the delivery portion comprises at least one recess that is indented from the cylinder wall.

23. The dosage-dispensing head of claim 22, wherein the conveying tool is supported in a way that allows translatory movement relative to the delivery- and closure element along the central lengthwise axis.

* * * * *